Patented Aug. 26, 1924.

1,506,472

UNITED STATES PATENT OFFICE.

JOHN W. WUERTZ, OF BUFFALO, NEW YORK, ASSIGNOR TO PRATT & LAMBERT, INC., OF BUFFALO, NEW YORK, A CORPORATION OF NEW YORK.

METHOD OF PRODUCING DULL-FINISHED ENAMEL SURFACES.

No Drawing.   Application filed June 22, 1922.   Serial No. 570,259.

*To all whom it may concern:*

Be it known that I, JOHN W. WUERTZ, a citizen of the United States, residing in Buffalo, in the county of Erie and State of New York, have invented new and useful Improvements in Methods of Producing Dull-Finished Enamel Surfaces, of which the following is a specification.

This invention relates to a method of producing a dull finish on a gloss enamel and has for its object to produce a finish of this character more expeditiously and economically than heretofore and also one which has better lasting qualities and is not liable to become glossy in time.

As is well known, enamels have come into much greater use during the last few years for interior decoration and the preservation of woods, metals, etc. The enamels used for these purposes are generally of two classes:—gloss enamel and egg shell or dull enamel. Practically all of the enamels which dry with an egg shell or dull finish are made according to one of two methods. One method employs an excessive amount of pigment and an additional quantity of thinners, which makes what is commercially known as "pigment flats", the degree of lustre being regulated by the amount of varnish used in the combination. The other method uses some chemical flattening agent mixed with an enamel that causes the surface to dry rough or with an egg shell finish.

All egg-shell enamels are far inferior to a gloss enamel so far as durability and preserving qualities are concerned. The pigment flats, when made of sufficient body to cover well, will show brush marks very easily and are therefore unsatisfactory. On the other hand, the egg shell enamels made from the flattening chemicals vary considerably in quality and do not cover anywhere near as well as a gloss enamel and are less durable. It therefore has been the custom in the past, when using enamel for the finest grade of interior decorating, to rub the gloss enamel with pumice stone and water in order to produce a dull finish and eliminate the high lustre on the surface. This however is very objectionable because such rubbing is a very tedious, laborious and time consuming operation and therefore very expensive so that its use is limited in most cases to the very highest priced jobs.

According to the present invention, a gloss enamel, such as "gloss vitralite" is first applied to the surface to be decorated or preserved and allowed to dry two or three days, or until its surface is no longer tacky but still slightly sticky or adhesive. After this a quantity of talc is applied to the surface of the enamel by dusting the same thereon, which causes as much of the talc to adhere and become incorporated in the sticky surface of the enamel as the same is capable of absorbing. Thereafter the surplus talc is removed from the surface of the enamel by wiping or brushing.

When the enamel is treated in this manner it takes on a practically permanent egg-shell finish which can not be washed off with soap and water, or any of the cleaning compounds commonly used, and it will not gloss up as much under friction as will the ordinary egg-shell enamels above described.

Owing to the ease and rapidity with which the talc may be dusted on the gloss enamel, the effect of a rubbed finish is obtained with practically no labor and no expenditure of time. This will be strikingly apparent when considering that the present method of applying talc permits of producing in a few minutes a satisfactory dull finish on gloss enamel of a certain surface, that would require an hour's work if done by rubbing with pumice stone and water in the manner heretofore commonly practiced.

In addition to being more rapid and economical, the present method of producing a dull finish on an enamel is further advantageous in that no abrasion of the surface of the enamel occurs which is always present when employing the pumice stone and water rubbing method.

To produce a dull white enamelled surface the gloss enamel must be white and the talc which is dusted on the same also pure white. When, however, the enamel is of a particular color, the talc dusted on the same must be correspondingly colored to very closely match the enamel in order to produce the desired dull effect.

Owing to the ease with which a dull effect can be produced on gloss enamel by this process, the same permits of doing such work at a great reduction in cost with the added advantage that the finished surface is superior to those finished in accordance with heretofore known methods.

I claim as my invention:

1. A dull finished enameled surface consisting of a coat of gloss enamel, and powdered talc applied to said enamel.

2. The hereindescribed method of producing a dull finish on a gloss enameled surface which consists in applying the enamel to the surface, and then dusting talc upon said enamel.

3. The hereindescribed method of producing a dull finish on a gloss enameled surface which consists in applying the enamel to the surface, then dusting talc upon said enamel, and then removing the surplus talc from the enamel.

4. The hereindescribed method of producing a dull finished enamel surface which consists in first applying a gloss enamel to the surface, then permitting said enamel to dry so that the same is no longer tacky but is slightly adherent, then dusting talc upon the enamel, and then removing the surplus talc from the enamel.

JOHN W. WUERTZ.